US012213018B2

(12) United States Patent
Zhu et al.

(10) Patent No.: US 12,213,018 B2
(45) Date of Patent: Jan. 28, 2025

(54) TECHNIQUES FOR SENSOR-ASSISTED CELL SEARCH MANAGEMENT

(71) Applicant: QUALCOMM Incorporated, San Diego, CA (US)

(72) Inventors: Jun Zhu, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 17/708,708

(22) Filed: Mar. 30, 2022

(65) Prior Publication Data
US 2023/0319670 A1   Oct. 5, 2023

(51) Int. Cl.
H04W 36/32     (2009.01)
H04W 16/28     (2009.01)
H04W 36/00     (2009.01)

(52) U.S. Cl.
CPC ........... *H04W 36/32* (2013.01); *H04W 16/28* (2013.01); *H04W 36/0058* (2018.08); *H04W 36/00835* (2018.08)

(58) Field of Classification Search
CPC . H04W 36/32; H04W 16/28; H04W 36/0058; H04W 36/00835; H04B 7/06952
See application file for complete search history.

(56) References Cited

U.S. PATENT DOCUMENTS

| 2019/0268061 A1* | 8/2019 | Li ........................... H04B 17/17 |
| 2020/0366340 A1* | 11/2020 | Zhang .................. H04B 7/0617 |
| 2020/0404644 A1 | 12/2020 | Zhu et al. |
| 2022/0256426 A1* | 8/2022 | Kim .................. H04W 36/0085 |

FOREIGN PATENT DOCUMENTS

WO    WO-2022015952 A2    1/2022

OTHER PUBLICATIONS

International Search Report and Written Opinion—PCT/US2023/015752—ISA/EPO—Jun. 13, 2023.

* cited by examiner

*Primary Examiner* — Steven Hieu D Nguyen
(74) *Attorney, Agent, or Firm* — Holland & Hart LLP

(57) ABSTRACT

Methods, systems, and devices for wireless communications are described. A network entity may transmit a reference signal to a user equipment (UE). The UE may measure, during a first time period and according to a first periodicity, the reference signal using a first beam associated with cell search. The UE may determine that a movement of the UE satisfies a movement threshold value based on an indication from a motion sensor. Additionally, the UE may determine that a channel metric fails to satisfy a threshold. In response, the UE may measure, during a second time period, the reference signal using the first beam according to a second periodicity that is greater than the first periodicity and corresponds to a more frequent measurement of the reference signal using the first beam than the first periodicity.

23 Claims, 11 Drawing Sheets

TECHNIQUES FOR SENSOR-ASSISTED CELL SEARCH MANAGEMENT

FIELD OF TECHNOLOGY

The present disclosure relates to wireless communications, including techniques for sensor-assisted cell search management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, the connection between a UE and a network entity may deteriorate, and the UE may attempt to improve the connection. In some cases, the UE may enter a cell panic mode in response to the drop in a channel metric associated with the deterioration in the connection. Entering the cell panic mode may result in an improved connection or in a cell handover. However, in some cases, entering the cell panic mode may result in unnecessary resource utilization and increased recovery latency, such as the case when beam switching may be more effective at improving the connection between the UE and the network entity.

SUMMARY

The described techniques relate to improved methods, systems, devices, and apparatuses that support techniques for sensor-assisted cell search management. Generally, the described techniques provide for sensor-assisted cell search management by reducing the frequency at which cell panic is triggered. For example, a user equipment (UE) may periodically receive reference signals, such as synchronization signal blocks (SSBs) or physical broadcast channel (PBCH) transmissions, among others. Triggering cell panic may increase a periodicity of (e.g., a frequency at which) the UE performing cell search based on a given reference signal rather than performing beam measurement based on the given reference signal, which may reduce a latency of cell recovery or cell handover if a connection between the UE and network entity over a cell deteriorates. However, triggering cell panic unnecessarily may increase beam recovery or beam switch latency, for example, if beam failure causes the connection to deteriorate. Sensor-assisted cell panic triggering may modify the criteria for triggering cell panic to be based on an output of a motion sensor of the UE, which may reduce the unnecessary triggering of cell panic. For instance, a combination of UE movement and channel metric (e.g., signal-to-noise ratio (SNR) or reference signal received quality (RSRQ)) deterioration may indicate that cell deterioration is likely to be the cause of the channel metric deterioration. Accordingly, the UE may be configured to trigger cell panic if the channel metric fails to satisfy (e.g., is less than, is less than or equal to) a threshold and the motion sensor indicates that the UE is moving (e.g., that a movement of the UE satisfies a movement threshold). In response, the UE may attempt to perform cell handover or cell recovery based on the cell search, and as a result, the UE may improve communication between the UE and a network entity.

Alternatively if the channel metric satisfies the threshold, the movement of the UE fails to satisfy the movement threshold, or both, the UE may refrain from triggering cell panic. For example, failure of the movement of the UE to satisfy the movement threshold may indicate that beam failure is likely to be the cause of channel metric deterioration. Accordingly, the UE may refrain from triggering cell panic to decrease cell search performance frequency while increasing beam measurement performance frequency compared to if cell panic were triggered. In this way, unnecessary cell panic triggering may be reduced.

A method for wireless communication at a UE is described. The method may include measuring, during a first time period and according to a first periodicity, a reference signal using a first beam associated with detecting a cell for the wireless communication, determining, based on an indication from a motion sensor, that a movement of the UE satisfies a movement threshold value, and measuring, during a second time period and according to a second periodicity, the reference signal using the first beam based on the movement of the UE satisfying the movement threshold value, where the second periodicity is greater than the first periodicity and corresponds to a more frequent measurement of the reference signal using the first beam than the first periodicity.

An apparatus for wireless communication at a UE is described. The apparatus may include a processor, memory coupled with the processor, and instructions stored in the memory. The instructions may be executable by the processor to cause the apparatus to measure, during a first time period and according to a first periodicity, a reference signal using a first beam associated with detecting a cell for the wireless communication, determine, based on an indication from a motion sensor, that a movement of the UE satisfies a movement threshold value, and measure, during a second time period and according to a second periodicity, the reference signal using the first beam based on the movement of the UE satisfying the movement threshold value, where the second periodicity is greater than the first periodicity and corresponds to a more frequent measurement of the reference signal using the first beam than the first periodicity.

Another apparatus for wireless communication at a UE is described. The apparatus may include means for measuring, during a first time period and according to a first periodicity, a reference signal using a first beam associated with detecting a cell for the wireless communication, means for determining, based on an indication from a motion sensor, that a movement of the UE satisfies a movement threshold value, and means for measuring, during a second time period and according to a second periodicity, the reference signal using the first beam based on the movement of the UE satisfying the movement threshold value, where the second periodicity is greater than the first periodicity and corresponds to a more frequent measurement of the reference signal using the first beam than the first periodicity.

A non-transitory computer-readable medium storing code for wireless communication at a UE is described. The code may include instructions executable by a processor to measure, during a first time period and according to a first periodicity, a reference signal using a first beam associated with detecting a cell for the wireless communication, determine, based on an indication from a motion sensor, that a movement of the UE satisfies a movement threshold value, and measure, during a second time period and according to a second periodicity, the reference signal using the first beam based on the movement of the UE satisfying the movement threshold value, where the second periodicity is greater than the first periodicity and corresponds to a more frequent measurement of the reference signal using the first beam than the first periodicity.

Some examples of the method, apparatuses, and non-transitory computer-readable medium described herein may further include operations, features, means, or instructions for measuring, during the first time period and according to a third periodicity, the reference signal using a second beam associated with beam sweeping, where the reference signal may be measured more frequently using the second beam than the first beam during the first time period based on the first periodicity and the third periodicity and measuring, during the second time period and according to a fourth periodicity, the reference signal using the second beam associated with beam sweeping based on the movement of the UE satisfying the movement threshold value, where the fourth periodicity corresponds to a less frequent measurement of the reference signal using the second beam than the third periodicity.

In some examples of the method, apparatuses, and non-transitory computer-readable medium described herein, the first beam may be associated with a first beam width and the second beam may be associated with a second beam width that may be greater than the first beam width.

Some examples of the method, apparatuses, and non-transitory computer-readable medium described herein may further include operations, features, means, or instructions for determining that a channel metric associated with the wireless communication fails to satisfy a threshold, where measuring the reference signal using the first beam according to the second periodicity may be based on the movement of the UE satisfying the movement threshold value and the channel metric failing to satisfy the threshold.

Some examples of the method, apparatuses, and non-transitory computer-readable medium described herein may further include operations, features, means, or instructions for determining that the movement of the UE satisfies the movement threshold value within a threshold duration before the channel metric fails to satisfy the threshold, where measuring the reference signal using the first beam according to the second periodicity may be based on the movement of the UE satisfying the movement threshold value within the threshold duration.

In some examples of the method, apparatuses, and non-transitory computer-readable medium described herein, the channel metric may be at least an SNR measurement, or an RSRQ measurement, or a combination thereof.

Some examples of the method, apparatuses, and non-transitory computer-readable medium described herein may further include operations, features, means, or instructions for determining that a channel metric associated with the wireless communication fails to satisfy a threshold, where the channel metric failing to satisfy the threshold may be associated with measuring the reference signal according to the second periodicity, determining, based on a second indication from the motion sensor, that the movement of the UE fails to satisfy the movement threshold value, and measuring, during a third time period, the reference signal using the first beam and according to the first periodicity based on the movement of the UE failing to satisfy the movement threshold value.

Some examples of the method, apparatuses, and non-transitory computer-readable medium described herein may further include operations, features, means, or instructions for determining, based on a second indication from the motion sensor, that the movement of the UE satisfies the movement threshold value, determining that a channel metric associated with the wireless communication satisfies a threshold, where the channel metric satisfying the threshold may be associated with measuring the reference signal according to the first periodicity, and measuring, during a third time period, the reference signal using the first beam and according to the first periodicity based on the channel metric satisfying the threshold.

Some examples of the method, apparatuses, and non-transitory computer-readable medium described herein may further include operations, features, means, or instructions for initiating a cell handover based on a measurement of the reference signal using the first beam during the second time period and according to the second periodicity.

In some examples of the method, apparatuses, and non-transitory computer-readable medium described herein, the first beam may be at least a layer 1 beam, or an omni-directional beam, or a combination thereof.

In some examples of the method, apparatuses, and non-transitory computer-readable medium described herein, the motion sensor may be an inertial measurement unit (IMU) that includes an accelerometer, a gyroscope, or both.

DETAILED DESCRIPTION

Figure 1:
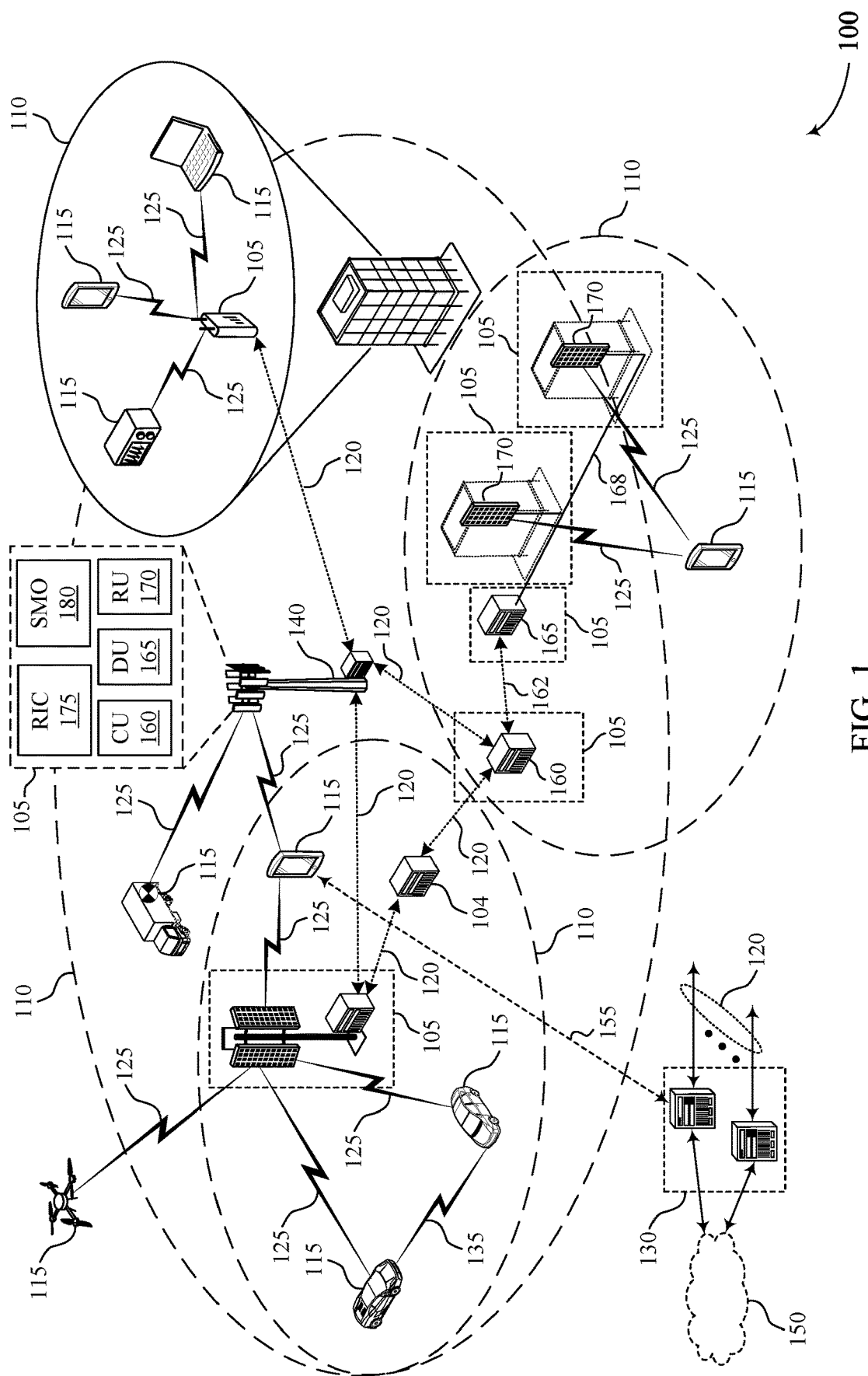
FIGS. 1 and 2 illustrate examples of a wireless communications system that supports techniques for sensor-assisted cell search management in accordance with one or more aspects of the present disclosure.

In some wireless communications systems, a user equipment (UE) may communicate with one or more network entities or cells using one or more beams for uplink communications, downlink communications, or both. In some examples, a connection between the UE and a network entity over a given cell may deteriorate (e.g., the connection may be lost, channel characteristics such as a signal-to-noise ratio (SNR) or a reference signal received quality (RSRQ) may drop), which may result in inefficient, less reliable, or terminated communication between the UE and the network entity. In order to improve the connection with the network entity or to establish a connection with another network entity, the UE may perform a cell detection (e.g., cell search) or beam measurement procedure to determine whether to perform a cell handover or a beam switch procedure. For example, a network entity may periodically transmit resources as reference signals (e.g., synchronization signal blocks (SSBs), physical broadcast channel (PBCH) transmissions) to the UE, and the UE may measure the reference signals using a beam based on the procedure performed by the UE. The UE may perform cell search by using a wide angle beam, such as a layer 1 beam, an omnidirectional beam, or a pseudo-omnidirectional beam to receive and measure a reference signal. Alternatively, the UE may perform beam measurement by using a narrow angle beam, such as a layer 2 or layer 3 beam to receive and measure the reference signal. Based on a measurement of the reference signal, the UE may determine whether to perform the cell handover procedure (e.g., if the wide angle beam is used) or the beam switch procedure (e.g., if the narrow angle beam is used).

In some examples, the UE may enter a cell panic mode (e.g., trigger cell panic) in an attempt to reduce a latency of cell handover or cell recovery through increased cell search. For example, triggering cell panic may result in the UE increasing a periodicity at which the UE performs cell search and decreasing a periodicity at which the UE performs beam measurement. Increasing cell search periodicity may increase the frequency at which the UE uses a wide angle beam to measure a reference signal, which may reduce cell handover or recovery latency, for example, by increasing opportunities for successfully performing cell handover or recovery based on a measurement of the reference signal.

In some examples, the UE may trigger cell panic in response to determining that a channel metric (e.g., SNR, RSRQ) fails to satisfy (e.g., is less than, is less than or equal to) a threshold (e.g., −6 decibel (dB), −18 dB, or some other threshold). In some cases, however, triggering cell panic may be unnecessary and may result in inefficient resource utilization due to performing cell search more frequently. For example, in the case where the UE is stationary and not located at a cell edge, a sub-optimal beam may be the most likely cause of the channel metric failing to satisfy the threshold. Here, performing beam measurement, rather than performing cell search, may reduce recovery time and may result in greater resource efficiency and reduced power consumption. Therefore, triggering cell panic based solely on the channel metric failing to satisfy the threshold may result in delayed recovery and increased power consumption.

Techniques, systems, and devices are described herein to enable sensor-assisted cell panic triggering, which may reduce the frequency at which cell panic is triggered. For example, sensor-assisted cell panic triggering may modify the criteria for triggering cell panic to be based on an output of a sensor of the UE. For instance, the UE may include a motion sensor such as an inertial motion unit (IMU) that measures a movement of the UE, a rotation of the UE, or a combination thereof. The UE may be configured to trigger cell panic if the channel metric fails to satisfy the threshold and the motion sensor indicates that the UE is moving (e.g., that a movement of the UE satisfies a movement threshold). For example, the movement of the UE in addition to the failure of the channel metric to satisfy the threshold may indicate an increased likelihood that cell failure or deterioration cause the channel metric to drop rather than beam failure. Therefore, the UE may trigger cell panic in response to determining that the channel metric fails to satisfy the threshold and the motion sensor indicating that the movement of the UE satisfies the movement threshold (e.g., within some threshold period of time before the channel metric fails to satisfy the threshold).

Alternatively, if the channel metric satisfies the threshold, the movement of the UE fails to satisfy the movement threshold, or both, the UE may refrain from triggering cell panic. In this example, refraining from triggering cell panic may result in decreasing cell search performance frequency while increasing beam measurement performance frequency compared to if cell panic were triggered. Therefore, the modified criteria for the UE to trigger cell panic may reduce a frequency at which the UE triggers cell panic, thereby reducing the performance of unnecessary cell search and increasing the performance of beam measurement when the channel metric fails to satisfy the threshold. This may result in increased power efficiency, reduced beam recovery or switching latency, improved resource utilization, and increased battery life, among other benefits.

Aspects of the disclosure are initially described in the context of wireless communications systems. Aspects of the disclosure are additionally described in the context of a communication sequence and a process flow. Aspects of the disclosure are further illustrated by and described with reference to apparatus diagrams, system diagrams, and flowcharts that relate to techniques for sensor-assisted cell search management.

FIG. 1 illustrates an example of a wireless communications system 100 that supports techniques for sensor-assisted cell search management in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for sensor-assisted cell search management as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peerto-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. In some examples, UEs 115 and network entities 105 may be configured to communicate within an operating band such as a frequency band 1 (FR1) between 4.1 GHz and 7.125 GHz, or a frequency band 2 (FR2) between 24.25 GHz and 52.6 GHz, among other operating bands. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

A UE 115 may support the performance of a cell search procedure, a beam measurement procedure, or both, using reference signals transmitted by a network entity 105. For example, the network entity 105 may periodically transmit reference signals, such as SSBs (e.g., SSB bursts) or PBCH transmissions, to the UE 115, and the UE 115 may measure the reference signals using a beam that is based on the procedure performed by the UE 115. For instance, the UE 115 may perform cell search (e.g., cell detection) by using a wide angle beam, such as a layer 1 beam, an omnidirectional beam, or a pseudo-omnidirectional beam, to receive and measure a reference signal. Measuring the reference signal may enable the UE 115 to determine a cell quality (e.g., a quality of a connection with the network entity 105 over the cell), and based on the cell quality, the UE 115 may determine whether to initiate cell handover or perform cell recovery. In some examples, the UE 115 may perform cell search on a given reference signal (e.g., a given SSB burst) in accordance with a SSB-based measurement timing configuration (SMTC) window. For example, the network entity 105 may transmit SSB bursts according to a first periodicity (e.g., 5 milliseconds (ms), 10 ms, 20 ms, 40 ms, etc.), and the UE 115 may perform cell search based on the SSB bursts according to a periodicity of the SMTC window, which may be the same as or different than the first periodicity. For instance, if the SSB burst periodicity is 5 ms and the SMTC window periodicity is 20 ms, the UE 115 may perform cell search on every fourth SSB burst. Remaining SSB bursts may be used to support other procedures, such as beam measurement (e.g., beam sweep) procedures.

For example, the UE 115 may perform beam measurement by using a narrow angle beam, such as a layer 2 or layer 3 beam, to receive and measure a reference signal transmitted by the network entity 105. In some examples, the UE 115 may measure one or more SSBs of an SSB burst using one or more beams. For example, the UE 115 may sweep through a set of UE beams to receive and measure a burst of SSBs transmitted by the network entity 105 using a set network entity beams. Based on the measurements (e.g., a signal strength of an SSB using a particular UE beam), the UE 115 may select a beam from the set of UE beams for communicating with the network entity 105, for example, that is associated with better communication characteristics relative to the other UE beams. In some examples, the UE 115 may select a new beam and switch to the new beam. In some examples, the UE 115 may determine to use a same beam based on the measurements. In some examples, the UE 115 may measure an SSB of an SSB burst using a current UE beam and determine whether to perform beam sweep based on a signal strength of the SSB.

In some examples, the UE 115 may enter a cell panic mode (e.g., trigger cell panic) in an attempt to reduce a latency of cell handover or cell recovery through increased cell search. For example, triggering cell panic may result in the UE 115 increasing the periodicity at which the UE 115 performs cell search and decreasing the periodicity at which the UE 115 performs beam measurement. For instance, triggering cell panic may increase a frequency of the SMTC window, thereby causing the UE 115 to perform cell search more frequently. As a result of the SMTC window frequency increasing, the UE 115 may perform beam measurement less frequently, for example, due to there being fewer SSB bursts available for beam measurement. In some examples, the competition for SSB resources between cell search and beam measurement may be frequency band dependent. For example, such SSB resource competition may occur if the UE 115 and the network entity 105 operate in the FR2 band. Triggering cell panic may reduce cell handover or recovery latency, for example, by increasing opportunities for successful cell handover or recovery based on the measurement of the reference signal.

In some cases, the UE 115 may trigger cell panic in response to determining that a channel metric, such as SNR, RSRQ, or both, fails to satisfy a threshold (e.g., if the SNR is less than −6 dB or the RSRQ is less than −18 dB). In some cases, however, triggering cell panic may be unnecessary and may result in inefficient resource utilization due to performing cell search more frequently. For example, in the case where the UE is stationary and not located at a cell edge, a sub-optimal beam may be the most likely cause of the channel metric failing to satisfy the threshold. Here, performing beam measurement, rather than performing cell search, may reduce recovery time and may result in greater resource efficiency. Therefore, triggering cell panic based solely on the channel metric failing to satisfy the threshold may result in delayed recovery and increased power consumption.

Various aspects of the described techniques support sensor-assisted cell panic triggering to reduce the unnecessary triggering of cell panic. For example, a UE 115 may be configured to trigger cell panic based on an output of a motion sensor of the UE, such as an IMU sensor. For instance, a lack of movement of the UE 115 in conjunction with a channel metric failing to satisfy a threshold may indicate that beam failure is a more likely cause of the channel metric deterioration rather than cell failure. Accordingly, if the UE 115 determines that the channel metric fails to satisfy the threshold and the motion sensor indicates that the UE 115 is moving (e.g., above a movement threshold) or has been moving recently (e.g., within the past second before the channel metric failed to satisfy the threshold), the UE 115 may trigger cell panic. Alternatively, if the motion sensor indicates that the UE 115 is stationary (e.g., or moving at a speed below the movement threshold), the UE 115 may refrain from triggering cell panic despite the channel metric failing to satisfy the threshold. In this way, the UE 115 may reduce the triggering of unnecessary cell panic.

Figure 2:
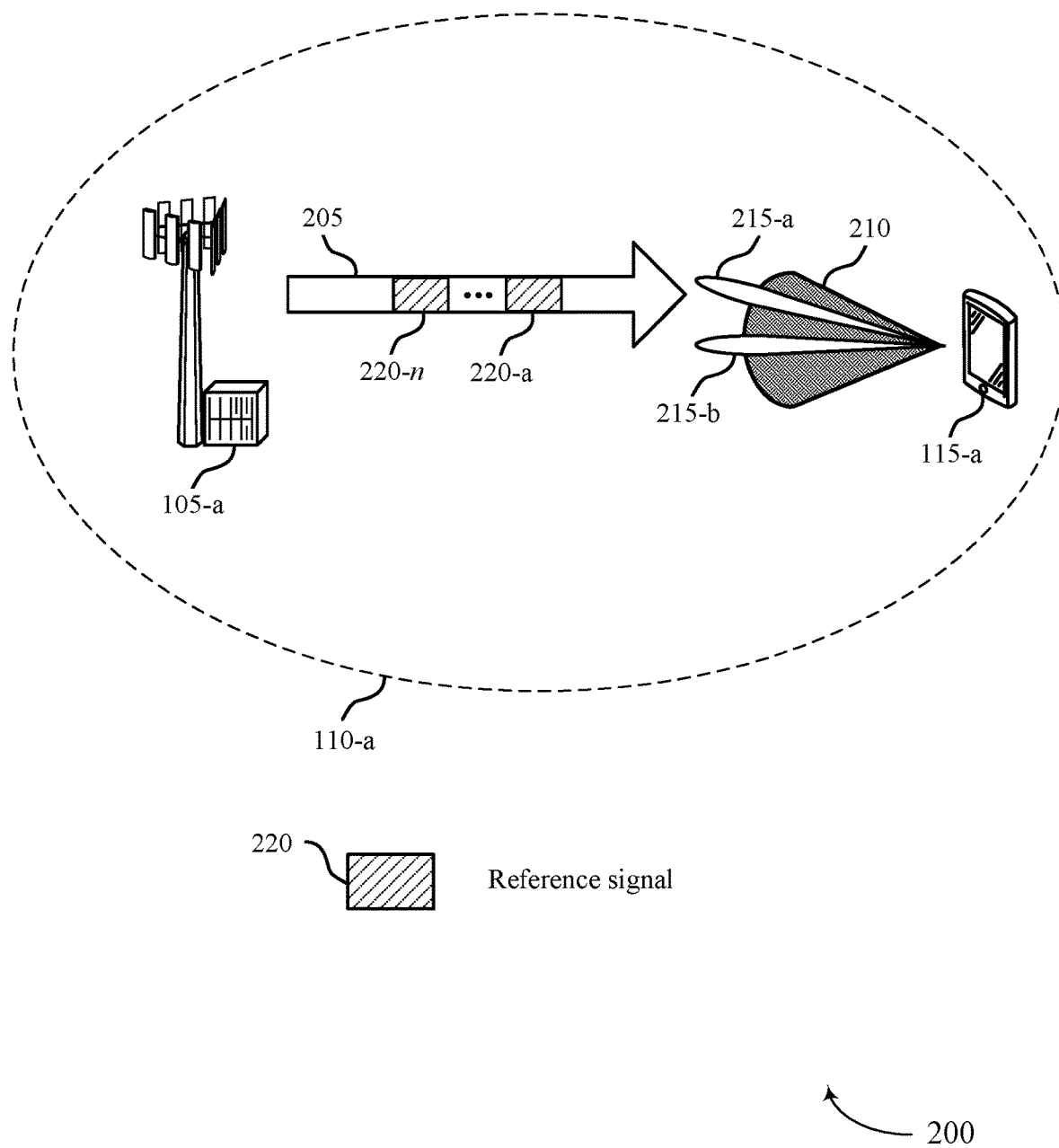

FIG. 2 illustrates an example of a wireless communications system 200 that supports techniques for sensor-assisted cell search management in accordance with one or more aspects of the present disclosure. In some examples, wireless communications system 200 may implement aspects of wireless communications system 100. For example, wireless communications system 200 may include a network entity 105-a and a UE 115-a, which may be examples of the corresponding devices described with reference to FIG. 1. The wireless communications system 200 may support the sensor-based triggering of cell panic by the UE 115-a, which may support reduced power consumption, reduced beam recovery or switching latency, reduced cell recovery or handover latency, improved resource utilization, and increased battery life, among other benefits.

The wireless communications system 200 may support communications between the UE 115-a and the network entity 105-a (e.g., within a coverage area 110-a of the network entity 105-a). For example, the UE 115-a and the network entity 105-a may communicate message over a communication link 205, which may be an example of a communication link 125 described with reference to FIG. 1. The wireless communications system 200 may additionally support beamformed communications between the network entity 105-a and the UE 115-a. For example, the network entity 105-a may transmit and receive messages using one or more beams, and the UE 115-a may transmit and receive messages using one or more beams 210 or one or more beams 215.

The network entity 105-a may transmit reference signals 220 to the UE 115-a to support cell search, beam measurement, or both. For example, the network entity 105-a may periodically transmit reference signals 220 (e.g., reference signal 220-a through reference signal 220-n), that the UE 115-a may use perform cell search or beam measurement based on a beam used to measure a given reference signal. In some examples, the UE 115-a may use a beam 210, which may correspond to a wide angle beam, to measure a reference signal 220 if performing cell search. That is, the beam 210 may be associated with (e.g., used for) detecting or measuring a cell for communicating with the network entity 105-a. In some examples, the UE 115-a may use a beam 215 (e.g., a beam 215-a, a beam 215-b, other beams 215, or a combination thereof), which may correspond to a narrow angle beam having a beam width that is less than a beam width of the beam 210, to measure a reference signal 220 if performing beam measurement. That is, the beams 215 may be associated with beam measurement (e.g., beam sweeping) for selection of a beam 215 to communicate with the network entity 105-a. In some examples, the reference signals 220 may correspond to a burst of reference signals. For example, the reference signal 220-a may correspond to an SSB burst transmitted by the network entity 105-a.

The UE 115-*a* may measure the reference signals 220 using the beam 210 or one or more beams 215 in accordance with configured periodicities and based on an operating mode of the UE 115-*a*. For example, if operating in a non-panic mode (e.g., a normal mode of operation, not in a cell panic mode), the UE 115-*a* may measure the reference signals 220 using the beam 210 according to a first periodicity and may measure the reference signals 220 using the one or more beams 215 according to a second periodicity. The first periodicity and the second periodicity may indicate which reference signals 220 are measured using the beam 210 and which reference signals 220 are measured using the one or more beams 215. In some examples, the second periodicity may be greater than the first periodicity such that the UE 115-*a* uses the one or more beams 215 to measure a reference signal 220 more frequently than it uses the beam 210.

Alternatively, if the UE 115-*a* operates in a panic mode, such as a cell panic mode, the UE 115-*a* may alter the periodicities at which the UE 115-*a* uses the beam 210 and the one or more beams 215 to measure the reference signals 220. For example, while operating in the cell panic mode, the UE 115-*a* may measure the reference signals 220 using the beam 210 according to a third periodicity and may measure the reference signals 220 using the one or more beams 215 according to a fourth periodicity. Here, the third periodicity may be greater than the first periodicity and the fourth periodicity may be less than the second periodicity. That is, based on operating in the cell panic mode, the UE 115-*a* may use the beam 210 more frequently to measure the reference signals 220 and use the one or more beams 215 less frequently to measure the reference signals 220 compared to when not operating in the cell panic mode. Such periodicity adjustments may support faster cell recovery or cell handover, for example, by increasing the frequency at which cell search is performed.

In accordance with examples disclosed herein, the UE 115-*a* may be configured to trigger cell panic based on an output of a motion sensor of the UE 115-*a*. For example, the UE 115-*a* may be configured to trigger cell panic in response to a channel metric, such as an SNR or an RSRQ, falling below a threshold. For instance, if an SNR measurement falls below a threshold SNR (e.g., −6 db, or some other dB value) or an RSRQ measurement falls below a threshold RSRQ (e.g., −18 dB, or some other dB value), the UE 115-*a* may be configured to trigger cell panic to enable faster cell recovery or cell handover. In some cases, however, deterioration of the channel metric may be caused by some other factor, such as beam failure, and triggering cell panic may delay beam recovery or beam switch by unnecessarily increasing cell search performance.

Triggering cell panic based on a motion sensor output may reduce the unnecessary triggering of cell panic. For example, the motion sensor (e.g., an IMU sensor) may indicate whether the UE 115-*a* is stationary, rotating, or moving (e.g., accelerating). In some examples, the motion sensor may include or be an accelerator that outputs a relatively small value (e.g., less than a movement threshold) if the UE 115-*a* is stationary or moving at a relatively slow speed and outputs a relatively large value (e.g., greater than a movement threshold) if the UE 115-*a* is moving at a relatively higher speed. In some examples, the motion sensor may include or be a gyroscope that outputs a relatively small value of the UE 115-*a* is stationary or rotating at a relatively slow speed and outputs a relatively large value if the UE 115-*a* is rotating at a relatively high speed. If the UE 115-*a* is stationary (e.g., or moving at a speed below a movement threshold), beam failure may be a more likely cause of channel metric deterioration than cell failure. Accordingly, if the motion sensor indicates to the UE 115-*a* that the UE 115-*a* is moving at a speed below the movement threshold (e.g., is stationary), the UE 115-*a* may refrain from triggering cell panic even if the channel metric fails to satisfy the threshold. Alternatively, if the motion sensor indicates to the UE 115-*a* that the UE 115-*a* is moving at a speed greater than the movement threshold, the UE 115-*a* may trigger cell panic if the channel metric also fails to satisfy the threshold.

The UE 115-*a* may enter and exit the cell panic mode based on the movement of the UE 115-*a*, the channel metric, or a combination thereof. For example, during a first time period, the UE 115-*a* may not be in the cell panic mode and may measure the reference signals 220 using the beam 210 and the one or more beams 215 according to the first periodicity and the second periodicity, respectively. The UE 115-*a* may determine that the criteria of the channel metric failing to satisfy the threshold and the movement of the UE 115-*a* satisfying (e.g., being greater than, greater than or equal to) the movement threshold are met and may enter the cell panic mode. Thus, during a second time period after the first time period, the UE 115-*a* may measure the reference signals 220 using the beam 210 and the one or more beams 215 according to the third periodicity and the fourth periodicity, respectively, based on entering the cell panic mode. If the either of the criteria fail to be met, the UE 115-*a* may exit the cell panic mode. For example, if either the movement of the UE 115-*a* fails to satisfy the movement threshold or the channel metric increases to be above the threshold, the UE 115-*a* may exit the cell panic mode. Thus, during a third time period, the UE 115-*a* may return to measuring the reference signals 220 using the beam 210 and the one or more beams 215 according to the first periodicity and the second periodicity, respectively.

In some examples, the UE 115-*a* may initiate a cell handover procedure more quickly based on triggering cell panic. For example, the UE 115-*a* may initiate the cell handover procedure based reference signal measurements performed during cell search. Additionally or alternatively, the UE 115-*a* may initiate the cell handover procedure in response to a connection between the network entity 105-*a* and the UE 115-*a* over the cell deteriorating (e.g., as indicated by a drop in the channel metric). Accordingly, by triggering cell panic, the UE 115-*a* may measure the reference signals 220 using the beam 210 more frequently (e.g., during the second time period) which may increase a likelihood that the UE 115-*a* initiates the cell handover procedure.

Figure 3:
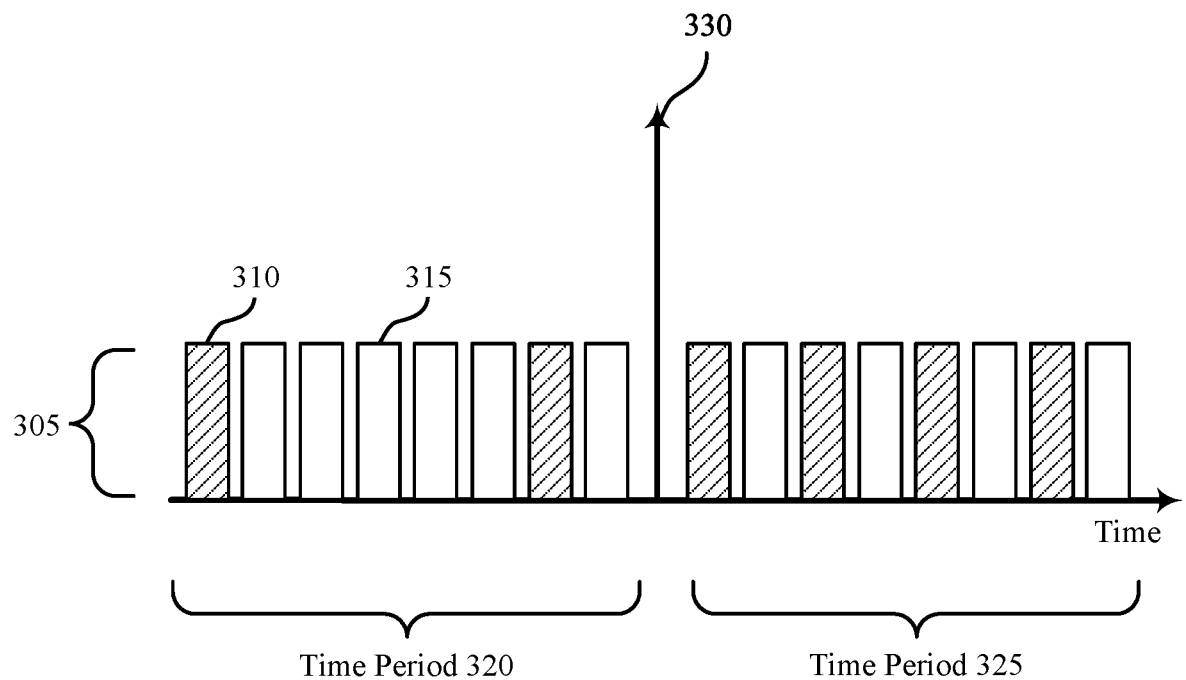
FIG. 3 illustrates an example of a communication sequence that supports techniques for sensor-assisted cell search management in accordance with one or more aspects of the present disclosure.
Figure 3:
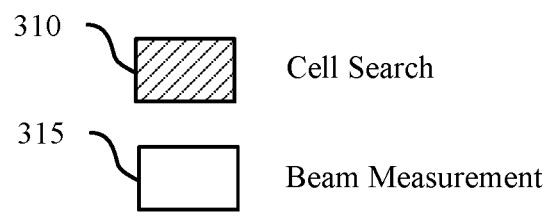

FIG. 3 illustrates an example of a communication sequence 300 that supports techniques for sensor-assisted cell search management in accordance with one or more aspects of the present disclosure. The communication sequence 300 may implement aspects of the wireless communications systems 100 and 200 or may be implemented by aspects of the wireless communications system 100 and 200 as described with reference to FIGS. 1 and 2, respectively. For example, the communication sequence 300 may be implemented by a UE 115 and a network entity 105 to support sensor-based triggering of cell panic by the UE 115.

The communication sequence 300 depicts reference signals 305 (e.g., reference signals 220) that may be periodically transmitted by a network entity 105 to a UE 115. In some examples, the reference signals 305 may be examples of an SSB or an SSB burst transmitted by the network entity 105. The UE 115 may perform cell search 310 or beam measurement 315 based on a reference signal 305 and according to configured periodicities. For example, the UE 115 may periodically perform cell search 310 (e.g., cell detection) by using a first beam associated with detecting a cell (e.g., a wide angle beam) to receive and measure a reference signal 305. Additionally or alternatively, the UE 115 may periodically perform beam measurement 315 (e.g., beam sweeping) by using a second beam associated with beam sweeping (e.g., a narrow angle beam) to receive and measure a reference signal 305. In some examples, the UE 115 may be unable to perform both cell search 310 and beam measurement 315 for a given reference signal 305. Instead, the UE 115 may be configured to perform either cell search 310 or beam measurement 315 in accordance with respective periodicities.

The UE 115 may adjust the periodicity at which it performs cell search 310 and beam measurement 315 based on an operating mode of the UE 115. For example, during a time period 320, the UE 115 may measure the reference signals 305 using the first beam (e.g., perform cell search 310) according to a first periodicity and measure the reference signals 305 using the second beam (e.g., perform beam measurement 315) according to a second periodicity. In some examples, the second periodicity may be greater than the first periodicity. That is, the UE 115 may perform beam measurement 315 more frequently than the UE 115 performs cell search 310. For instance, in the example of FIG. 3, the first periodicity may indicate for the UE 115 to perform cell search 310 once for every six reference signals 305 received, and the second periodicity may indicate for the UE 115 to perform beam measurement for the remaining five reference signals 305 received (e.g., for five out every six reference signals 305 received). It is noted that the periodicities described in FIG. 3 are example periodicities and that the techniques described herein may be adapted and applied such that the UE 115 may perform cell search 310 and beam measurement 315 according to any configured periodicities.

At a time 330, the UE 115 may adjust the periodicities at which it performs cell search 310 and beam measurement 315 in response to triggering cell panic. For example, in response to triggering cell panic at time 330, the UE 115 may adjust the first periodicity and the second periodicity to perform cell search 310 according to a third periodicity and beam measurement according to a fourth periodicity during a time period 325. The third periodicity may be greater than the first periodicity and the fourth periodicity may be less than the second periodicity. That is, during the time period 325, the UE 115 may perform cell search 310 more frequently than during the time period 320 and may perform beam measurement 315 less frequently than during the time period 320. In the example of FIG. 3, the third periodicity may indicate for the UE 115 to perform cell search 310 for every other reference signal 305 received, and the fourth periodicity may indicate for the UE 115 to perform beam measurement 315 for the other reference signals 305 received.

To avoid the unnecessary triggering of cell panic (e.g., at time 330), the UE 115 may be configured to support sensor-assisted cell panic triggering, which may reduce the frequency at which cell panic is triggered by modifying the criteria for triggering cell panic. For example, the UE 115 may trigger cell panic at the time 330 in response to determining that a movement of the UE 115 satisfies a movement threshold and that a channel metric fails to satisfy a threshold. In some examples, the UE 115 may trigger cell panic if the movement of the UE 115 satisfies the movement threshold within a threshold duration before the channel metric fails to satisfy the threshold. For example, if the UE 115 determine that the channel metric fails to satisfy the threshold at time 330, the UE 115 may determine whether a motion sensor of the UE 115 indicated that the movement of the UE satisfied the movement threshold within some threshold duration (e.g., 0.5 seconds, 1 second, or some other threshold duration) before the time 330.

In some examples, the motion sensor may measure and indicate the movement of the UE 115 at different times than when the UE 115 measures the channel metric. Determining whether the movement threshold was satisfied within the threshold duration of the time 330 may enable the criteria for cell panic triggering to be met without happening at a same time. Therefore, the channel metric failing to satisfy the threshold may or may not be simultaneous with the motion sensor indicating that the movement threshold is satisfied, which may support increased flexibility in triggering cell panic.

In some examples, the UE 115 may not trigger cell panic at the time 330 if the movement of the UE 115 fails to satisfy the movement threshold, the channel metric satisfies the threshold, or both. Here, the UE 115 may refrain from increasing the frequency of performing cell search 310 and reducing the frequency of performing beam measurement 315.

Figure 4:
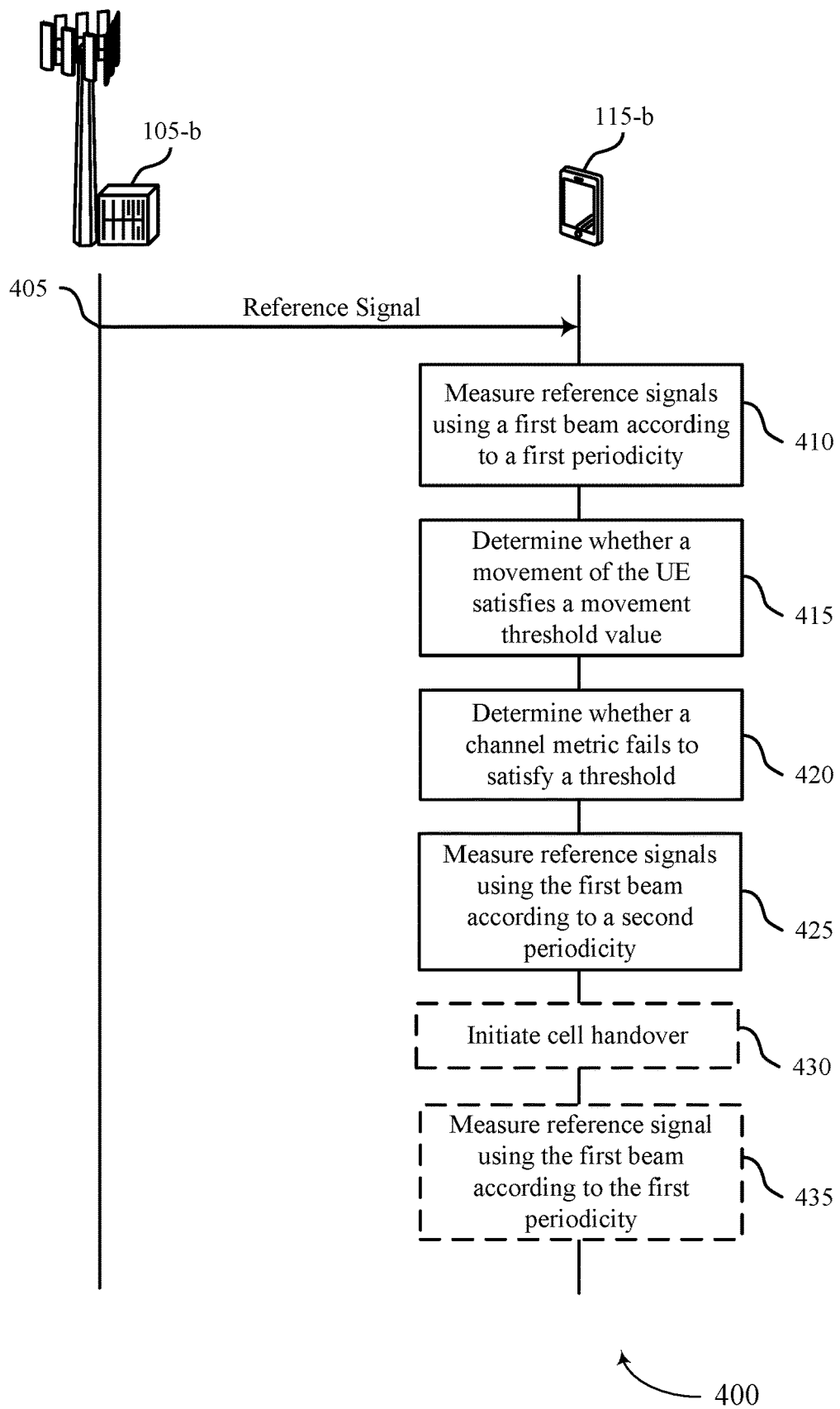
FIG. 4 illustrates an example of a process flow that supports techniques for sensor-assisted cell search management in accordance with one or more aspects of the present disclosure.

FIG. 4 illustrates an example of a process flow 400 that supports techniques for sensor-assisted cell search management in accordance with one or more aspects of the present disclosure. In some examples, process flow 400 may implement aspects of wireless communications system 100 and wireless communications system 200. For example, process flow 400 may be implemented by a network entity 105-b and a UE 115-b, which may be examples of the corresponding devices described with reference to FIG. 1 and FIG. 2. The process flow 400 may be implemented by the network entity 105-b and the UE 115-b to support sensor-based triggering of cell panic by the UE 115-b.

In the following description of the process flow 400, the operations may be performed in different orders or at different times. Some operations may also be omitted from the process flow 400, and other operations may be added to the process flow 400.

At 405, the network entity 105-b may transmit reference signals to the UE 115-b. For example, the network entity 105-b may periodically transmit reference signals, such as SSBs, SSB bursts, PBCH transmissions, or a combination thereof.

At 410, the UE 115-b may measure the reference signals using a first beam or a second beam. The first beam may be a wide angle beam, such as a layer 1 beam, an omni-directional beam, or both, and the first beam may be associated with cell search (e.g., detecting a cell for wireless communication between the network entity 105-b and the UE 115-b). The second beam may be a narrow angle beam, such as a layer 2 or a layer 3 beam, and the second beam may be associated with beam measurement (e.g., beam sweeping). During a first time period, the UE 115-b may measure the reference signals using the first beam (e.g., perform cell search) according to a first periodicity and may measure the reference signals using the second beam (e.g., perform beam measurement) according to a second periodicity. The first time period may correspond to a time period during which the UE 115-b is not in a cell panic mode. Additionally, the UE 115-b may measure a channel metric, such as SNR, RSRQ, or both.

At 415, the UE 115-b may determine whether a movement of the UE 115-b satisfies a movement threshold value. For example, the UE 115-*b* may include a motion sensor that indicates the movement of the UE 115-*b*. The UE 115-*b* may be configured with a movement threshold value (e.g., by the network entity 105-*b*) to which the UE 115-*b* compares the movement of the UE 115-*b* indicated by the motion sensor.

At 420, the UE 115-*b* may determine whether the channel metric fails to satisfy a threshold value. For example, the UE 115-*b* may determine whether an SNR is less than a threshold SNR, an RSRQ is less than a threshold RSRQ, or both.

At 425, the UE 115-*b* may trigger cell panic based on the movement of the UE satisfying the movement threshold and the channel metric failing to satisfy the threshold. As a result, the UE 115-*b* may measure the reference signals using the first beam according to a third periodicity and measure the reference signals using the second beam according to a fourth periodicity during a second time period corresponding to a time period during which cell panic is triggered. The third periodicity may be greater than the first periodicity and may correspond to the UE 115-*b* increasing the frequency of cell search performance using the first beam. Additionally, the fourth periodicity may be less than the second periodicity and may correspond to the UE 115-*b* decreasing the frequency of beam measurement performance using the second beam.

At 430, in some examples, the UE 115-*b* may initiate cell handover based on performing cell search and triggering cell panic. For example, to restore communications with a network, the UE 115-*b* may initiate the cell handover based on a measurement of a reference signal using the first beam during the second time period.

At 435, in some examples, the UE 115-*b* may measure the reference signals during a third time period based on the movement of the UE 115-*b* failing to satisfy the movement threshold, the channel metric satisfying the threshold, or both. For example, the UE 115-*b* may exit the cell panic mode in response to determining that the movement of the UE 115-*b* fails to satisfy the movement threshold, the channel metric satisfies the threshold, or both. Accordingly, during the third time period, the UE 115-*b* may return to measuring the reference signals using the first beam and the second beam according to the first periodicity and the second periodicity, respectively. In some examples, the UE 115-*b* may subsequently enter the cell panic mode, for example, if the criteria for entering cell panic mode are again met.

Figure 5:
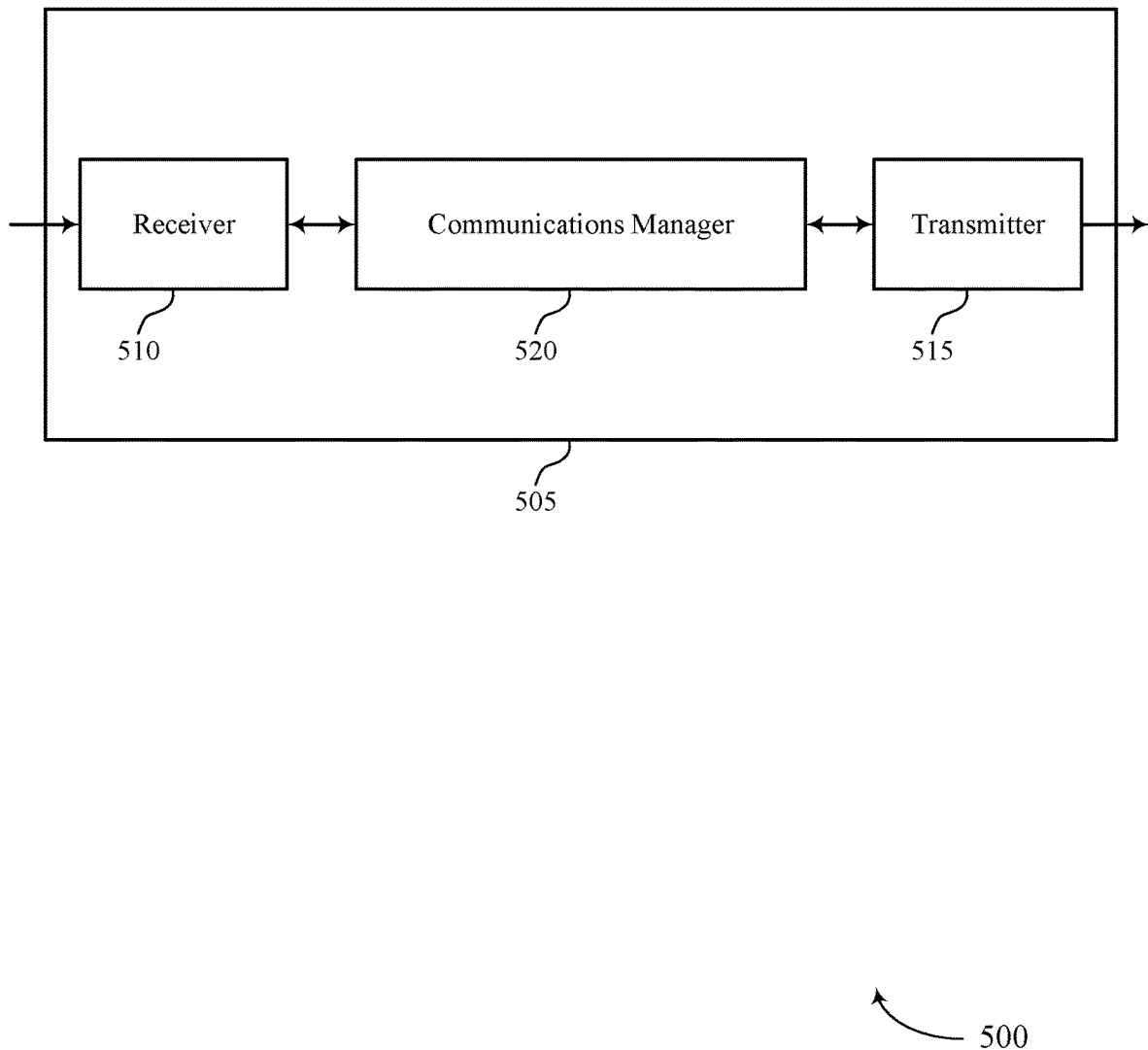
FIGS. 5 and 6 show block diagrams of devices that support techniques for sensor-assisted cell search management in accordance with one or more aspects of the present disclosure.

FIG. 5 shows a block diagram 500 of a device 505 that supports techniques for sensor-assisted cell search management in accordance with one or more aspects of the present disclosure. The device 505 may be an example of aspects of a UE 115 as described herein. The device 505 may include a receiver 510, a transmitter 515, and a communications manager 520. The device 505 may also include one or more processors, memory coupled with the one or more processors, and instructions stored in the memory that are executable by the one or more processors to enable the one or more processors to perform the sensor-assisted cell panic triggering features discussed herein. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for sensor-assisted cell search management). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for sensor-assisted cell search management). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for sensor-assisted cell search management as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for measuring, during a first time period and according to a first periodicity, a reference signal using a first beam associated with detecting a cell for the wireless communication. The communications manager 520 may be configured as or otherwise support a means for determining, based on an indication from a motion sensor, that a movement of the UE satisfies a movement threshold value. The communications manager 520 may be configured as or otherwise support a means for measuring, during a second time period and according to a second periodicity, the reference signal using the first beam based on the movement of the UE satisfying the movement threshold value, where the second periodicity is greater than the first periodicity and corresponds to a more frequent measurement of the reference signal using the first beam than the first periodicity.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption and increased processing utilization, for example, reducing unnecessary cell search performance.

Figure 6:
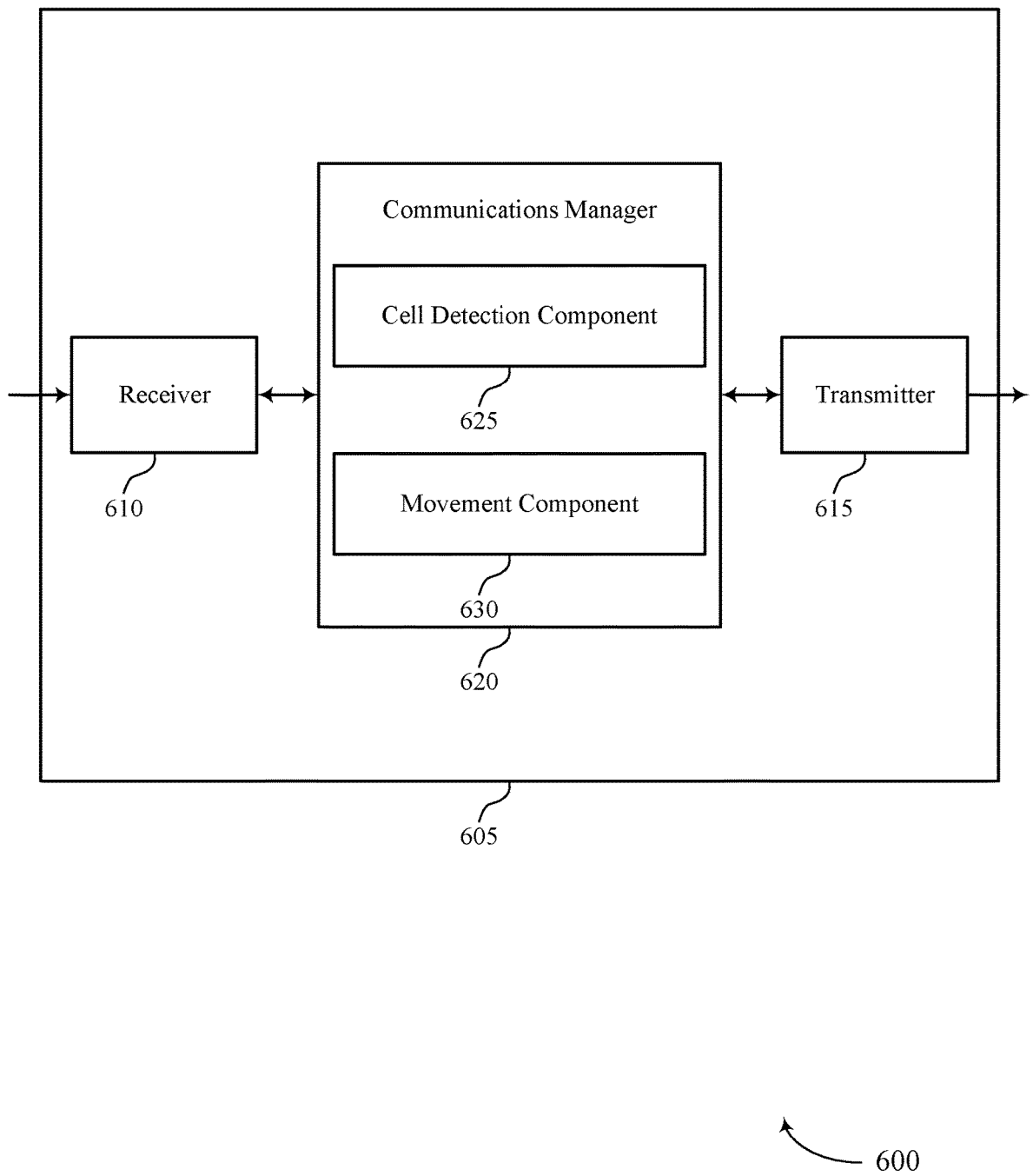

FIG. 6 shows a block diagram 600 of a device 605 that supports techniques for sensor-assisted cell search management in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sensor-assisted cell search management). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sensor-assisted cell search management). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for sensor-assisted cell search management as described herein. For example, the communications manager 620 may include a cell detection component 625 a movement component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The cell detection component 625 may be configured as or otherwise support a means for measuring, during a first time period and according to a first periodicity, a reference signal using a first beam associated with detecting a cell for the wireless communication. The movement component 630 may be configured as or otherwise support a means for determining, based on an indication from a motion sensor, that a movement of the UE satisfies a movement threshold value. The cell detection component 625 may be configured as or otherwise support a means for measuring, during a second time period and according to a second periodicity, the reference signal using the first beam based on the movement of the UE satisfying the movement threshold value, where the second periodicity is greater than the first periodicity and corresponds to a more frequent measurement of the reference signal using the first beam than the first periodicity.

In some cases, the cell detection component 625 and the movement component 630 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the cell detection component 625 and the movement component 630 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 7:
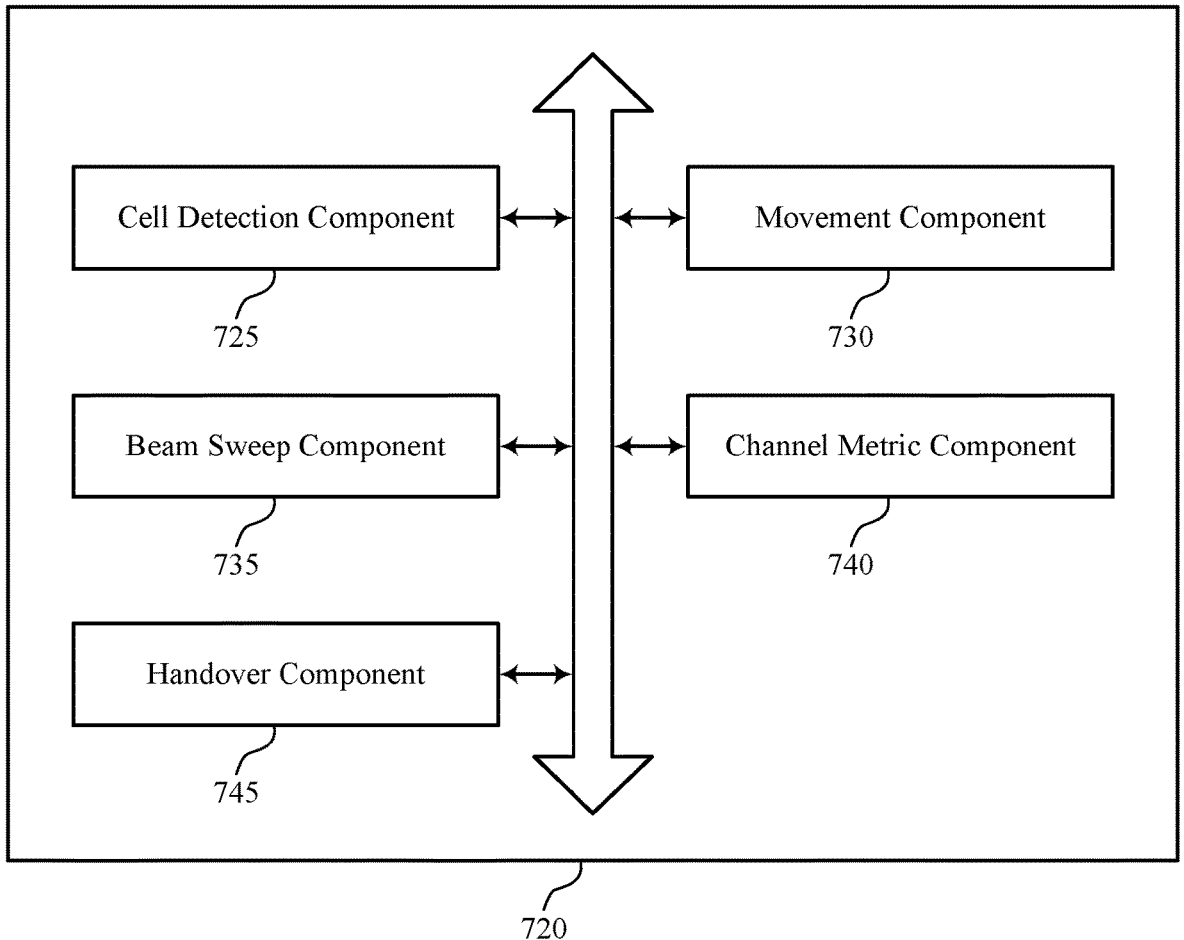
FIG. 7 shows a block diagram of a communications manager that supports techniques for sensor-assisted cell search management in accordance with one or more aspects of the present disclosure.

FIG. 7 shows a block diagram 700 of a communications manager 720 that supports techniques for sensor-assisted cell search management in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for sensor-assisted cell search management as described herein. For example, the communications manager 720 may include a cell detection component 725, a movement component 730, a beam sweep component 735, a channel metric component 740, a handover component 745, or any combination thereof. Each of these components may communicate, directly or indirectly, with one another (e.g., via one or more buses).

The communications manager 720 may support wireless communication at a UE in accordance with examples as disclosed herein. The cell detection component 725 may be configured as or otherwise support a means for measuring, during a first time period and according to a first periodicity, a reference signal using a first beam associated with detecting a cell for the wireless communication. The movement component 730 may be configured as or otherwise support a means for determining, based on an indication from a motion sensor, that a movement of the UE satisfies a movement threshold value. In some examples, the cell detection component 725 may be configured as or otherwise support a means for measuring, during a second time period and according to a second periodicity, the reference signal using the first beam based on the movement of the UE satisfying the movement threshold value, where the second periodicity is greater than the first periodicity and corresponds to a more frequent measurement of the reference signal using the first beam than the first periodicity.

In some examples, the beam sweep component 735 may be configured as or otherwise support a means for measuring, during the first time period and according to a third periodicity, the reference signal using a second beam associated with beam sweeping, where the reference signal is measured more frequently using the second beam than the first beam during the first time period based on the first periodicity and the third periodicity. In some examples, the beam sweep component 735 may be configured as or otherwise support a means for measuring, during the second time period and according to a fourth periodicity, the reference signal using the second beam associated with beam sweeping based on the movement of the UE satisfying the movement threshold value, where the fourth periodicity corresponds to a less frequent measurement of the reference signal using the second beam than the third periodicity.

In some examples, the first beam is associated with a first beam width and the second beam is associated with a second beam width that is greater than the first beam width.

In some examples, the channel metric component 740 may be configured as or otherwise support a means for determining that a channel metric associated with the wireless communication fails to satisfy a threshold, where measuring the reference signal using the first beam according to the second periodicity is based on the movement of the UE satisfying the movement threshold value and the channel metric failing to satisfy the threshold.

In some examples, the movement component 730 may be configured as or otherwise support a means for determining that the movement of the UE satisfies the movement threshold value within a threshold duration before the channel metric fails to satisfy the threshold, where measuring the reference signal using the first beam according to the second periodicity is based on the movement of the UE satisfying the movement threshold value within the threshold duration.

In some examples, the channel metric is at least an SNR measurement, or an RSRQ measurement, or a combination thereof.

In some examples, the channel metric component 740 may be configured as or otherwise support a means for determining that a channel metric associated with the wireless communication fails to satisfy a threshold, where the channel metric failing to satisfy the threshold is associated with measuring the reference signal according to the second periodicity. In some examples, the movement component 730 may be configured as or otherwise support a means for determining, based on a second indication from the motion sensor, that the movement of the UE fails to satisfy the movement threshold value. In some examples, the cell detection component 725 may be configured as or otherwise support a means for measuring, during a third time period, the reference signal using the first beam and according to the first periodicity based on the movement of the UE failing to satisfy the movement threshold value.

In some examples, the channel metric component 740 may be configured as or otherwise support a means for determining, based on a second indication from the motion sensor, that the movement of the UE satisfies the movement threshold value. In some examples, the movement component 730 may be configured as or otherwise support a means for determining that a channel metric associated with the wireless communication satisfies a threshold, where the channel metric satisfying the threshold is associated with measuring the reference signal according to the first periodicity. In some examples, the cell detection component 725 may be configured as or otherwise support a means for measuring, during a third time period, the reference signal using the first beam and according to the first periodicity based on the channel metric satisfying the threshold.

In some examples, the handover component 745 may be configured as or otherwise support a means for initiating a cell handover based on a measurement of the reference signal using the first beam during the second time period and according to the second periodicity.

In some examples, the first beam is at least a layer 1 beam, or an omni-directional beam, or a combination thereof.

In some examples, the motion sensor is an IMU that includes an accelerometer, a gyroscope, or both.

In some cases, the cell detection component 725, the movement component 730, the beam sweep component 735, the channel metric component 740, and the handover component 745 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the cell detection component 725, the movement component 730, the beam sweep component 735, the channel metric component 740, and the handover component 745 discussed herein.

Figure 8:
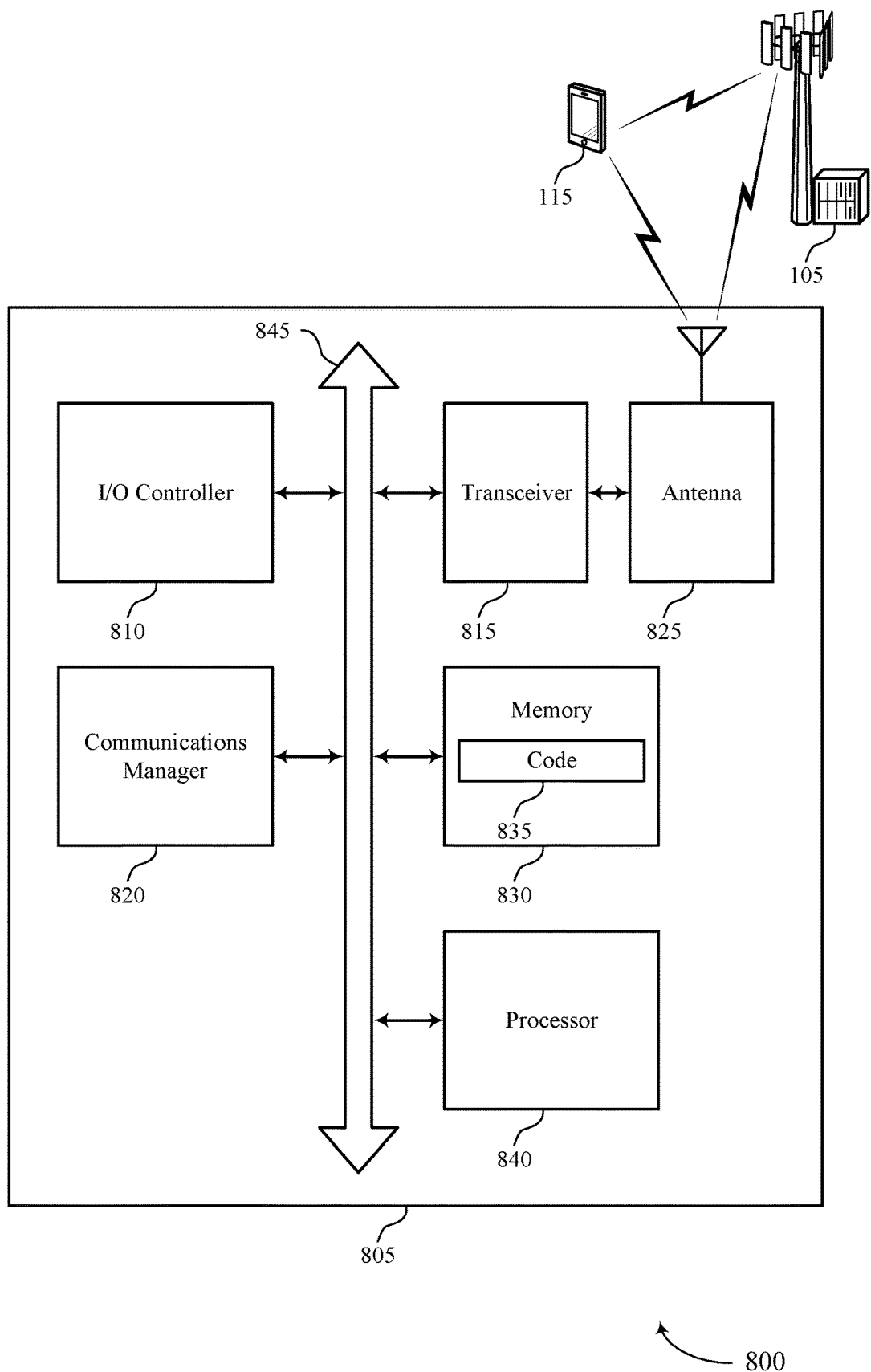
FIG. 8 shows a diagram of a system including a device that supports techniques for sensor-assisted cell search management in accordance with one or more aspects of the present disclosure.

FIG. 8 shows a diagram of a system 800 including a device 805 that supports techniques for sensor-assisted cell search management in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for sensor-assisted cell search management). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for measuring, during a first time period and according to a first periodicity, a reference signal using a first beam associated with detecting a cell for the wireless communication. The communications manager 820 may be configured as or otherwise support a means for determining, based on an indication from a motion sensor, that a movement of the UE satisfies a movement threshold value. The communications manager 820 may be configured as or otherwise support a means for measuring, during a second time period and according to a second periodicity, the reference signal using the first beam based on the movement of the UE satisfying the movement threshold value, where the second periodicity is greater than the first periodicity and corresponds to a more frequent measurement of the reference signal using the first beam than the first periodicity.

By including or configuring the communications manager 820 in accordance with examples as described herein, the device 805 may support techniques for reduced latency, reduced power consumption, more efficient utilization of communication resources, and improved coordination between devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for sensor-assisted cell search management as described herein, or the processor 840 and the memory 830 may be otherwise configured to perform or support such operations.

Figure 9:
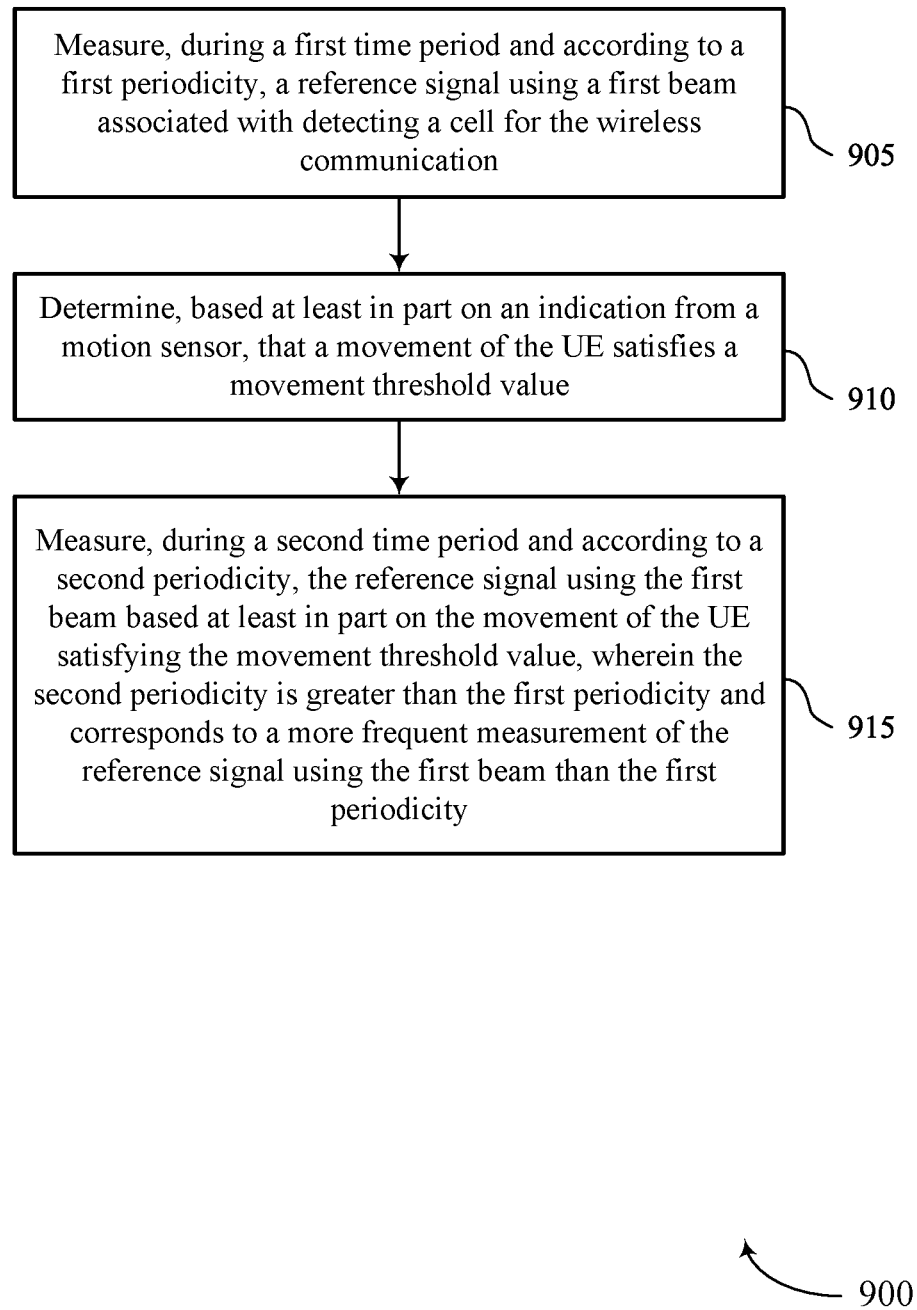
FIGS. 9 through 11 show flowcharts illustrating methods that support techniques for sensor-assisted cell search management in accordance with one or more aspects of the present disclosure.

FIG. 9 shows a flowchart illustrating a method 900 that supports techniques for sensor-assisted cell search management in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include measuring, during a first time period and according to a first periodicity, a reference signal using a first beam associated with detecting a cell for the wireless communication. The operations of 905 may be performed in accordance with examples as disclosed herein. In some examples, aspects of the operations of 905 may be performed by a cell detection component 725 as described with reference to FIG. 7.

At 910, the method may include determining, based on an indication from a motion sensor, that a movement of the UE satisfies a movement threshold value. The operations of 910 may be performed in accordance with examples as disclosed herein. In some examples, aspects of the operations of 910 may be performed by a movement component 730 as described with reference to FIG. 7.

At 915, the method may include measuring, during a second time period and according to a second periodicity, the reference signal using the first beam based on the movement of the UE satisfying the movement threshold value, where the second periodicity is greater than the first periodicity and corresponds to a more frequent measurement of the reference signal using the first beam than the first periodicity. The operations of 915 may be performed in accordance with examples as disclosed herein. In some examples, aspects of the operations of 915 may be performed by a cell detection component 725 as described with reference to FIG. 7.

Figure 10:
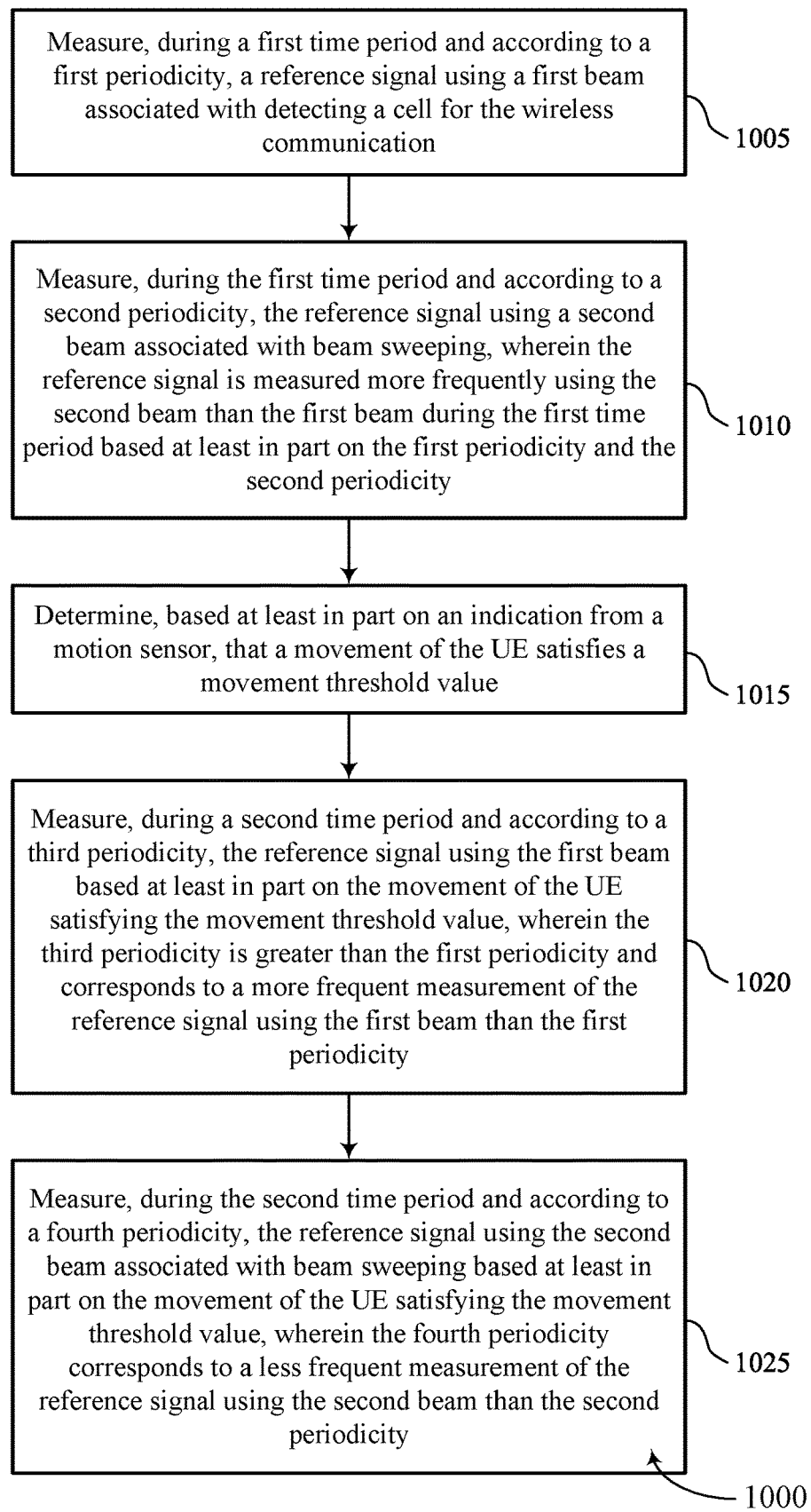

FIG. 10 shows a flowchart illustrating a method 1000 that supports techniques for sensor-assisted cell search management in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include measuring, during a first time period and according to a first periodicity, a reference signal using a first beam associated with detecting a cell for the wireless communication. The operations of 1005 may be performed in accordance with examples as disclosed herein. In some examples, aspects of the operations of 1005 may be performed by a cell detection component 725 as described with reference to FIG. 7.

At 1010, the method may include measuring, during the first time period and according to a second periodicity, the reference signal using a second beam associated with beam sweeping, where the reference signal is measured more frequently using the second beam than the first beam during the first time period based on the first periodicity and the second periodicity. The operations of 1010 may be performed in accordance with examples as disclosed herein. In some examples, aspects of the operations of 1010 may be performed by a beam sweep component 735 as described with reference to FIG. 7.

At 1015, the method may include determining, based on an indication from a motion sensor, that a movement of the UE satisfies a movement threshold value. The operations of 1015 may be performed in accordance with examples as disclosed herein. In some examples, aspects of the operations of 1015 may be performed by a movement component 730 as described with reference to FIG. 7.

At 1020, the method may include measuring, during a second time period and according to a third periodicity, the reference signal using the first beam based on the movement of the UE satisfying the movement threshold value, where the third periodicity is greater than the first periodicity and corresponds to a more frequent measurement of the reference signal using the first beam than the first periodicity. The operations of 1020 may be performed in accordance with examples as disclosed herein. In some examples, aspects of the operations of 1020 may be performed by a cell detection component 725 as described with reference to FIG. 7.

At 1025, the method may include measuring, during the second time period and according to a fourth periodicity, the reference signal using the second beam associated with beam sweeping based on the movement of the UE satisfying the movement threshold value, where the fourth periodicity corresponds to a less frequent measurement of the reference signal using the second beam than the second periodicity. The operations of 1025 may be performed in accordance with examples as disclosed herein. In some examples, aspects of the operations of 1025 may be performed by a beam sweep component 735 as described with reference to FIG. 7.

Figure 11:
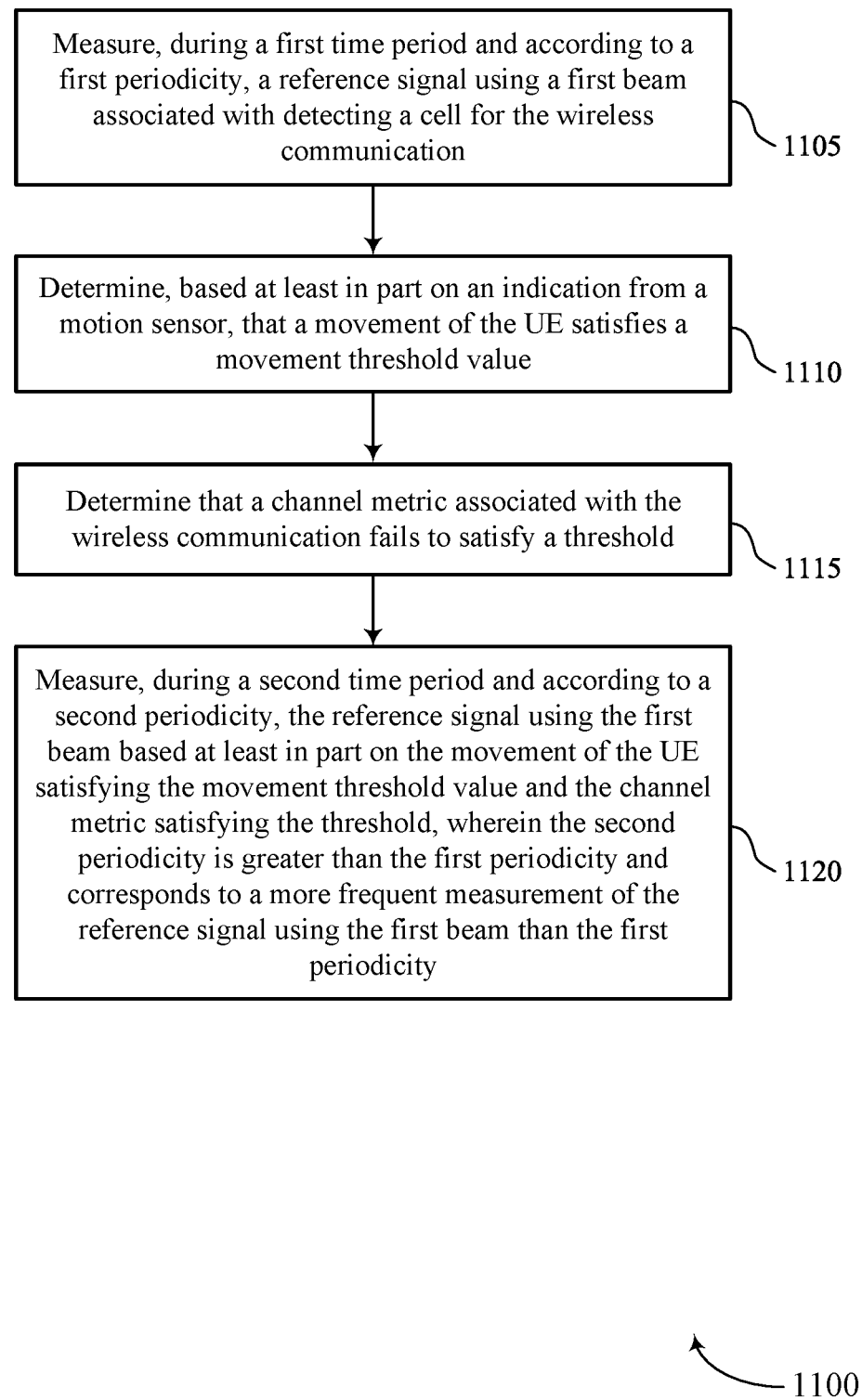

FIG. 11 shows a flowchart illustrating a method 1100 that supports techniques for sensor-assisted cell search management in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include measuring, during a first time period and according to a first periodicity, a reference signal using a first beam associated with detecting a cell for the wireless communication. The operations of 1105 may be performed in accordance with examples as disclosed herein. In some examples, aspects of the operations of 1105 may be performed by a cell detection component 725 as described with reference to FIG. 7.

At 1110, the method may include determining, based on an indication from a motion sensor, that a movement of the UE satisfies a movement threshold value. The operations of 1110 may be performed in accordance with examples as disclosed herein. In some examples, aspects of the operations of 1110 may be performed by a movement component 730 as described with reference to FIG. 7.

At 1115, the method may include determining that a channel metric associated with the wireless communication fails to satisfy a threshold. The operations of 1115 may be performed in accordance with examples as disclosed herein. In some examples, aspects of the operations of 1115 may be performed by a channel metric component 740 as described with reference to FIG. 7.

At 1120, the method may include measuring, during a second time period and according to a second periodicity, the reference signal using the first beam based on the movement of the UE satisfying the movement threshold value and the channel metric failing to satisfy the threshold, where the second periodicity is greater than the first periodicity and corresponds to a more frequent measurement of the reference signal using the first beam than the first periodicity. The operations of 1120 may be performed in accordance with examples as disclosed herein. In some examples, aspects of the operations of 1120 may be performed by a cell detection component 725 as described with reference to FIG. 7.

The following provides an overview of aspects of the present disclosure:

Aspect 1: A method for wireless communication at a UE, comprising: measuring, during a first time period and according to a first periodicity, a reference signal using a first beam associated with detecting a cell for the wireless communication; determining, based at least in part on an indication from a motion sensor, that a movement of the UE satisfies a movement threshold value; measuring, during a second time period and according to a second periodicity, the reference signal using the first beam based at least in part on the movement of the UE satisfying the movement threshold value, wherein the second periodicity is greater than the first periodicity and corresponds to a more frequent measurement of the reference signal using the first beam than the first periodicity.

Aspect 2: The method of aspect 1, further comprising: measuring, during the first time period and according to a third periodicity, the reference signal using a second beam associated with beam sweeping, wherein the reference signal is measured more frequently using the second beam than the first beam during the first time period based at least in part on the first periodicity and the third periodicity; and measuring, during the second time period and according to a fourth periodicity, the reference signal using the second beam associated with beam sweeping based at least in part on the movement of the UE satisfying the movement threshold value, wherein the fourth periodicity corresponds to a less frequent measurement of the reference signal using the second beam than the third periodicity.

Aspect 3: The method of aspect 2, wherein the first beam is associated with a first beam width and the second beam is associated with a second beam width that is greater than the first beam width.

Aspect 4: The method of any of aspects 1 through 3, further comprising: determining that a channel metric associated with the wireless communication fails to satisfy a threshold, wherein measuring the reference signal using the first beam according to the second periodicity is based at least in part on the movement of the UE satisfying the movement threshold value and the channel metric failing to satisfy the threshold.

Aspect 5: The method of aspect 4, further comprising: determining that the movement of the UE satisfies the movement threshold value within a threshold duration before the channel metric fails to satisfy the threshold, wherein measuring the reference signal using the first beam according to the second periodicity is based at least in part on the movement of the UE satisfying the movement threshold value within the threshold duration.

Aspect 6: The method of any of aspects 4 through 5, wherein the channel metric is at least an SNR measurement, or an RSRQ measurement, or a combination thereof.

Aspect 7: The method of any of aspects 1 through 6, further comprising: determining that a channel metric associated with the wireless communication fails to satisfy a threshold, wherein the channel metric failing to satisfy the threshold is associated with measuring the reference signal according to the second periodicity; determining, based at least in part on a second indication from the motion sensor, that the movement of the UE fails to satisfy the movement threshold value; and measuring, during a third time period, the reference signal using the first beam and according to the first periodicity based at least in part on the movement of the UE failing to satisfy the movement threshold value Aspect 8: The method of any of aspects 1 through 6, further comprising: determining, based at least in part on a second indication from the motion sensor, that the movement of the UE satisfies the movement threshold value; determining that a channel metric associated with the wireless communication satisfies a threshold, wherein the channel metric satisfying the threshold is associated with measuring the reference signal according to the first periodicity; and measuring, during a third time period, the reference signal using the first beam and according to the first periodicity based at least in part on the channel metric satisfying the threshold.

Aspect 9: The method of any of aspects 1 through 8, further comprising: initiating a cell handover based at least in part on a measurement of the reference signal using the first beam during the second time period and according to the second periodicity.

Aspect 10: The method of any of aspects 1 through 9, wherein the first beam is at least a layer 1 beam, or an omni-directional beam, or a combination thereof.

Aspect 11: The method of any of aspects 1 through 10, wherein the motion sensor is an IMU that includes an accelerometer, a gyroscope, or both.

Aspect 12: An apparatus for wireless communication at a UE, comprising a processor; memory coupled with the processor; and instructions stored in the memory and executable by the processor to cause the apparatus to perform a method of any of aspects 1 through 11.

Aspect 13: An apparatus for wireless communication at a UE, comprising at least one means for performing a method of any of aspects 1 through 11.

Aspect 14: A non-transitory computer-readable medium storing code for wireless communication at a UE, the code comprising instructions executable by a processor to perform a method of any of aspects 1 through 11.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    one or more processors;
    memory coupled with the one or more processors; and
    instructions stored in the memory and executable by the one or more processors to cause the apparatus to:
        measure, during a first time period and according to a first periodicity, a reference signal using a first beam associated with detecting a cell for the wireless communication;
        determine, based at least in part on an indication from a motion sensor, that a movement of the UE satisfies a movement threshold value;
        determine that a channel metric associated with the wireless communication fails to satisfy a threshold; and
        measure, during a second time period and according to a second periodicity, the reference signal using the first beam based at least in part on the movement of the UE satisfying the movement threshold value and the channel metric failing to satisfy the threshold, wherein the second periodicity is greater than the first periodicity and corresponds to a more frequent measurement of the reference signal using the first beam than the first periodicity.

2. The apparatus of claim 1, wherein the instructions are further executable by the one or more processors to cause the apparatus to:
    measure, during the first time period and according to a third periodicity, the reference signal using a second beam associated with beam sweeping, wherein the reference signal is measured more frequently using the second beam than the first beam during the first time period based at least in part on the first periodicity and the third periodicity; and
    measure, during the second time period and according to a fourth periodicity, the reference signal using the second beam associated with beam sweeping based at least in part on the movement of the UE satisfying the movement threshold value, wherein the fourth periodicity corresponds to a less frequent measurement of the reference signal using the second beam than the third periodicity.

3. The apparatus of claim 2, wherein the first beam is associated with a first beam width and the second beam is associated with a second beam width that is greater than the first beam width.

4. The apparatus of claim 1, wherein the instructions are further executable by the one or more processors to cause the apparatus to:
    determine that the movement of the UE satisfies the movement threshold value within a threshold duration before the channel metric fails to satisfy the threshold, wherein measuring the reference signal using the first beam according to the second periodicity is based at least in part on the movement of the UE satisfying the movement threshold value within the threshold duration.

5. The apparatus of claim 1, wherein the channel metric is at least a signal-to-noise (SNR) measurement, or a reference signal reception quality (RSRQ) measurement, or a combination thereof.

6. The apparatus of claim 1, wherein the instructions are further executable by the one or more processors to cause the apparatus to:
determine that a channel metric associated with the wireless communication fails to satisfy a threshold, wherein the channel metric failing to satisfy the threshold is associated with measuring the reference signal according to the second periodicity;
determine, based at least in part on a second indication from the motion sensor, that the movement of the UE fails to satisfy the movement threshold value; and
measure, during a third time period, the reference signal using the first beam and according to the first periodicity based at least in part on the movement of the UE failing to satisfy the movement threshold value.

7. The apparatus of claim 1, wherein the instructions are further executable by the one or more processors to cause the apparatus to:
determine, based at least in part on a second indication from the motion sensor, that the movement of the UE satisfies the movement threshold value;
determine that a channel metric associated with the wireless communication satisfies a threshold, wherein the channel metric satisfying the threshold is associated with measuring the reference signal according to the first periodicity; and
measure, during a third time period, the reference signal using the first beam and according to the first periodicity based at least in part on the channel metric satisfying the threshold.

8. The apparatus of claim 1, wherein the instructions are further executable by the one or more processors to cause the apparatus to:
initiate a cell handover based at least in part on a measurement of the reference signal using the first beam during the second time period and according to the second periodicity.

9. The apparatus of claim 1, wherein the first beam is at least a layer 1 beam, or an omni-directional beam, or a combination thereof.

10. The apparatus of claim 1, wherein the motion sensor is an inertial measurement unit (IMU) that includes an accelerometer, a gyroscope, or both.

11. A method for wireless communication at a user equipment (UE), comprising:
measuring, during a first time period and according to a first periodicity, a reference signal using a first beam associated with detecting a cell for the wireless communication;
determining, based at least in part on an indication from a motion sensor, that a movement of the UE satisfies a movement threshold value;
determining that a channel metric associated with the wireless communication fails to satisfy a threshold; and
measuring, during a second time period and according to a second periodicity, the reference signal using the first beam based at least in part on the movement of the UE satisfying the movement threshold value and the channel metric failing to satisfy the threshold, wherein the second periodicity is greater than the first periodicity and corresponds to a more frequent measurement of the reference signal using the first beam than the first periodicity.

12. The method of claim 11, further comprising:
measuring, during the first time period and according to a third periodicity, the reference signal using a second beam associated with beam sweeping, wherein the reference signal is measured more frequently using the second beam than the first beam during the first time period based at least in part on the first periodicity and the third periodicity; and
measuring, during the second time period and according to a fourth periodicity, the reference signal using the second beam associated with beam sweeping based at least in part on the movement of the UE satisfying the movement threshold value, wherein the fourth periodicity corresponds to a less frequent measurement of the reference signal using the second beam than the third periodicity.

13. The method of claim 12, wherein the first beam is associated with a first beam width and the second beam is associated with a second beam width that is greater than the first beam width.

14. The method of claim 11, further comprising:
determining that the movement of the UE satisfies the movement threshold value within a threshold duration before the channel metric fails to satisfy the threshold, wherein measuring the reference signal using the first beam according to the second periodicity is based at least in part on the movement of the UE satisfying the movement threshold value within the threshold duration.

15. The method of claim 11, wherein the channel metric is at least a signal-to-noise (SNR) measurement, or a reference signal reception quality (RSRQ) measurement, or a combination thereof.

16. The method of claim 11, further comprising:
determining that a channel metric associated with the wireless communication fails to satisfy a threshold, wherein the channel metric failing to satisfy the threshold is associated with measuring the reference signal according to the second periodicity;
determining, based at least in part on a second indication from the motion sensor, that the movement of the UE fails to satisfy the movement threshold value; and
measuring, during a third time period, the reference signal using the first beam and according to the first periodicity based at least in part on the movement of the UE failing to satisfy the movement threshold value.

17. The method of claim 11, further comprising:
determining, based at least in part on a second indication from the motion sensor, that the movement of the UE satisfies the movement threshold value;
determining that a channel metric associated with the wireless communication satisfies a threshold, wherein the channel metric satisfying the threshold is associated with measuring the reference signal according to the first periodicity; and
measuring, during a third time period, the reference signal using the first beam and according to the first periodicity based at least in part on the channel metric satisfying the threshold.

18. The method of claim 11, further comprising:
initiating a cell handover based at least in part on a measurement of the reference signal using the first beam during the second time period and according to the second periodicity.

19. The method of claim 11, wherein the first beam is at least a layer 1 beam, or an omni-directional beam, or a combination thereof.

20. The method of claim 11, wherein the motion sensor is an inertial measurement unit (IMU) that includes an accelerometer, a gyroscope, or both.

21. An apparatus for wireless communication at a user equipment (UE), comprising:
- means for measuring, during a first time period and according to a first periodicity, a reference signal using a first beam associated with detecting a cell for the wireless communication;
- means for determining, based at least in part on an indication from a motion sensor, that a movement of the UE satisfies a movement threshold value;
- means for determining that a channel metric associated with the wireless communication fails to satisfy a threshold; and
- means for measuring, during a second time period and according to a second periodicity, the reference signal using the first beam based at least in part on the movement of the UE satisfying the movement threshold value and the channel metric failing to satisfy the threshold, wherein the second periodicity is greater than the first periodicity and corresponds to a more frequent measurement of the reference signal using the first beam than the first periodicity.

22. The apparatus of claim 21, further comprising:
- means for measuring, during the first time period and according to a third periodicity, the reference signal using a second beam associated with beam sweeping, wherein the reference signal is measured more frequently using the second beam than the first beam during the first time period based at least in part on the first periodicity and the third periodicity; and
- means for measuring, during the second time period and according to a fourth periodicity, the reference signal using the second beam associated with beam sweeping based at least in part on the movement of the UE satisfying the movement threshold value, wherein the fourth periodicity corresponds to a less frequent measurement of the reference signal using the second beam than the third periodicity.

23. The apparatus of claim 21, further comprising:
- means for determining that the movement of the UE satisfies the movement threshold value within a threshold duration before the channel metric fails to satisfy the threshold, wherein measuring the reference signal using the first beam according to the second periodicity is based at least in part on the movement of the UE satisfying the movement threshold value within the threshold duration.

* * * * *